Sept. 3, 1940.  H. R. WEST  2,213,892
SYSTEM OF MOTOR CONTROL
Filed Dec. 9, 1937  2 Sheets-Sheet 1
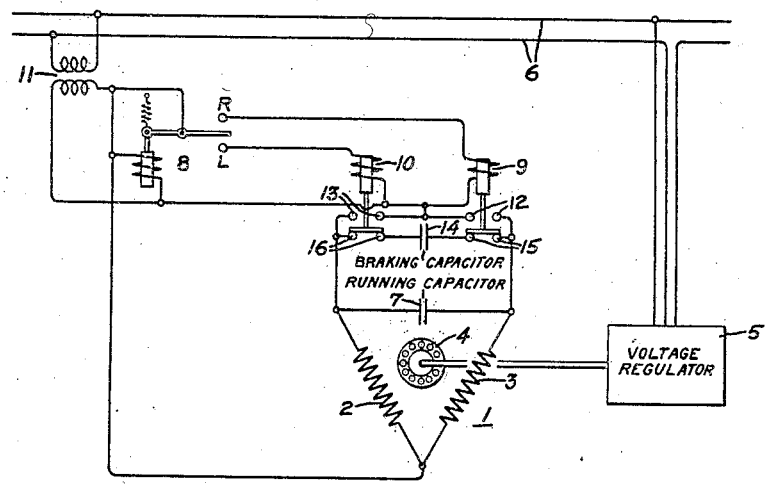
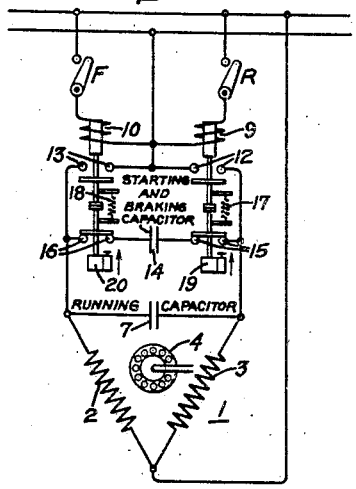 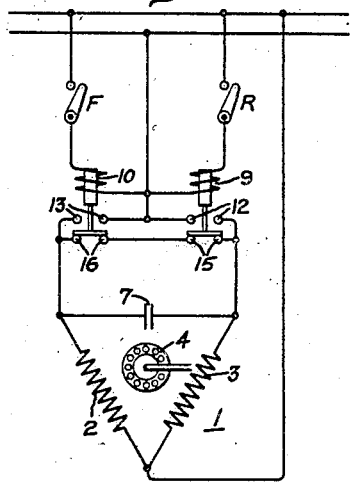
Inventor:
Harry R. West,
by Harry E. Dunham
His Attorney.

Sept. 3, 1940.   H. R. WEST   2,213,892

SYSTEM OF MOTOR CONTROL

Filed Dec. 9, 1937   2 Sheets-Sheet 2

Inventor:
Harry R. West,
by Harry E. Dunham
His Attorney.

Patented Sept. 3, 1940

2,213,892

UNITED STATES PATENT OFFICE 2,213,892

SYSTEM OF MOTOR CONTROL

Harry R. West, Pittsfield, Mass., assignor to General Electric Company, a corporation of New York Application December 9, 1937, Serial No. 178,976

8 Claims. (Cl. 172—233)

This invention relates to motor control systems and more particularly to improvements in dynamic braking circuits for electric motors.

While the invention in its broader aspects is adapted for use with electric motors generally, the application which I at present wish to make of it is to the motors which drive automatic feeder voltage regulators, such as induction regulators and step regulators. These motors are fractional horsepower motors and are usually induction motors of the capacitor split phase type. They are automatically controlled for operation in both the forward direction and the reverse direction and it is important that they be braked to standstill very quickly after the connections for forward or reverse operation are interrupted, so as to prevent over-running and hunting of the regulating system.

Heretofore, the conventional braking means employed for this purpose has been an electromagnetically operated mechanical brake. This brake is usually so arranged that it is applied by a spring and it is held off by the magnet, thus requiring energization of the magnet during motor operation and producing objectionable losses. Furthermore, this brake occupies a considerable amount of space and is not an inconsiderable item of cost.

In practicing this invention the motor is made to act as its own brake by means of novel and simple changes which are made in the connections as soon as the running connections are broken. The invention is further characterized by securing a strong dynamic braking effect without having the motor windings excited from the supply circuit.

An object of the invention is to provide a novel and simple system of motor control.

Another object of the invention is to provide a novel and simple system for dynamically braking an electric motor whose windings are unexcited by its supply circuit.

A further object of the invention is to provide an improved and inexpensive system for electrically braking reversible capacitor motors.

The invention will be better understood from the following description taken in connection with the accompanying drawings and its scope will be pointed out in the appended claims.

Figure 4:
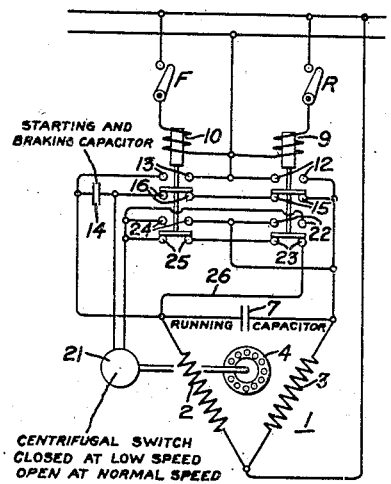
Figure 5:
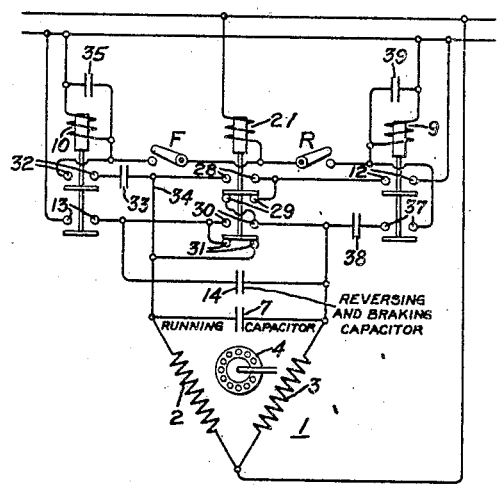
Figure 6:
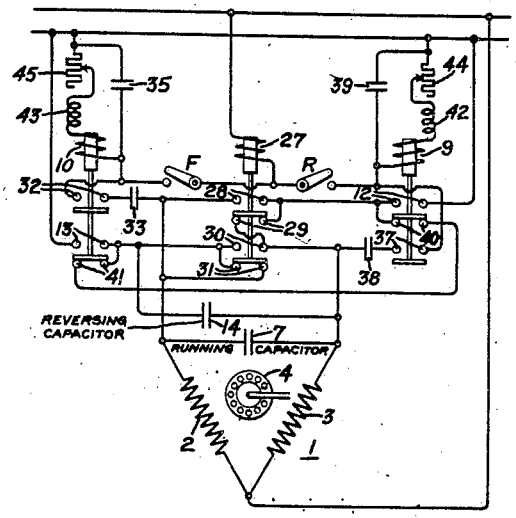

In the drawings Fig. 1 is a diagrammatic illustration of a simple and practical form of the invention applied to an automatic feeder voltage regulator driving motor, Fig. 2 is a modification permitting the auxiliary braking capacitor used in Fig. 1 also to operate as a starting capacitor, Fig. 3 is another modification in which capacitor short circuiting is used during braking, Fig. 4 is a modification of Fig. 2 utilizing a centrifugal switch and combining successively the braking connections of Figs. 2 and 3, Fig. 5 is an additional modification utilizing an initial plugging connection followed by a dynamic braking connection and making use of novel time delay drop out alternating current contactors and Fig. 6 is a modification of Fig. 5 in which capacitor short circuiting is utilized in the final stages of braking.

Referring now to the drawings, and more particularly to Fig. 1, the invention is shown as applied to a reversible capacitator motor 1 having a stator provided with windings 2 and 3 and a rotor 4 connected to drive a voltage regulator 5 for a feeder circuit 6. Regulator 5 may be any suitable and well-known form of voltage regulator, for example, an induction type feeder voltage regulator.

Windings 2 and 3 are connected in a permanently closed circuit through a phase splitting impedance shown as a capacitor 7. With such an arrangement, if winding 2 is connected across an alternating current supply circuit, the capacitor will advance the phase of the current in winding 3 and cause the motor to run in one direction, whereas if winding 3 is connected across the supply circuit, the capacitor will then advance the phase of the current in winding 2, thereby causing the motor to run in the opposite direction.

The above connections are made automatically in response to departures from a normal value of the voltage of circuit 6 by means of a primary relay or contacting-making voltmeter 8 and a pair of auxiliary raise and lower relays 9 and 10. Motor 1, primary relay 8 and auxiliary relays 9 and 10 all are energized from the main circuit 6 through a suitable potential transformer 11. Thus, the operating winding of the relay 8 is connected directly across the secondary winding of the potential transformer while the operating windings of the relays 9 and 10 are arranged to be connected across the secondary winding of the potential transformer 11 by closure respectively of the raise and lower contacts of the primary relay whenever the voltage falls or rises a predetermined amount above normal. Relay 9 has a set of contacts 12 which close when the relay is actuated and the closure of these contacts serves to connect the motor winding 3 directly across the secondary winding of the transformer 11. Likewise, the relay 10 has a set of contacts 13 for connecting the motor winding 2 directly across the potential transformer.

If now the voltage of circuit 6 should fall below normal for any reason, the raise contacts of the primary relay 8 will close, thereby energizing the relay 9 which causes it to close its contacts 12 and thereby energize the motor 1. The motor will then turn in such direction as to cause the regulator to raise the voltage of the circuit 6 and this action will continue until the voltage is restored to normal whereupon the raise contacts of the primary relay will open and the relay 9 and motor 1 will be de-energized. In a like manner, if the voltage rises above normal the lower contacts of the primary relay 8 will close, thereby causing the relay 10 to close its contacts 13 and energize the motor 1 for reverse operation, whereby the voltage regulator lowers the voltage of circuit 6 until normal voltage is again attained at which point the lower contacts will separate and the relay 10 and motor 1 will be de-energized.

It should, of course, be understood that a complete automatic feeder regulator contains many additional elements such as a line drop compensator, limit switches, and a voltage stabilizer, but for the sake of simplicity these have not been illustrated as they form no part of the present invention.

As thus far described the regulating system has no braking means and, therefore, when the motor is deenergized, its inertia and the inertia of the regulator will cause these devices to coast to rest with the result that the regulator is likely to go too far and cause over-regulation in the sense that if the voltage has been too high and the regulator is lowering the voltage, it will continue to lower the voltage below normal to such an extent that the raise contacts will close and cause a reverse operation. This reverse operation may then continue too far so that the regulator in coasting to rest raises the voltage above normal to such an extent that the lower contacts of the primary relay will close. In this manner the regulator will run back and forth and cause excessive wear of the parts.

In order to prevent this over-running there is provided a braking capacitor 14 which is adapted to be connected in parallel with the running capacitor 7 by means of auxiliary contacts 15 and 16 on the relays 9 and 10 respectively, whenever the primary relay is in its mid-position and auxiliary relays 9 and 10 have dropped out.

The operation of this braking circuit is as follows. When the motor is de-energized, the flux which persists for a short time in the rotor generates a voltage in the windings which causes a current to flow through the windings and capacitor in series, and this current causes a braking action. The motor at such times is an induction generator, the load on which is represented by the losses caused by the flow of the circulating current in the rotor winding and capacitors.

Theoretically, a braking effect will be secured with the running capacitor alone, but as a practical matter, this braking effect is not sufficient where very sudden stopping is required. On the other hand, if the braking capacitor were to be permanently connected in parallel with the running capacitor, or in other words, if the size of the running capacitor were increased so as to be the equivalent of the running capacitor plus the braking capacitor, the motor would have very poor operating characteristics and it would have excessively high losses.

There is no correct generalization which can be made regarding the relative sizes of the running and braking capacitors. The size of capacitor that will give the greatest starting torque is generally much greater than that which is actually used in motors of this type. Also, it is possible that a very large braking capacitor would give a somewhat greater braking effect than ordinary size braking capacitors which have been used in testing this invention. Theoretically, the size of capacitor which will give the most effective braking at any instant depends on the speed of the motor at that particular instant. In other words, to get the greatest possible braking torque throughout the full braking period, the capacitance should change as the speed changes, and as the speed approaches zero, the capacitance should approach infinity, that is to say, it should be short-circuited. For certain purposes sufficient braking is obtained by merely short-circuiting the capacitor as is illustrated in Fig. 3. Such a short-circuiting connection has been tried out and gives a very definite braking effect, although it is appreciably less than that which is obtained by the use of a braking capacitor as in Fig. 1.

The contacts of the relays 9 and 10 should be so arranged that the contacts 15 and 16 close immediately after their associated contacts 12 and 13 open. This is to insure that the motor flux has not had time to decay appreciably before the braking capacitor is connected in circuit.

Furthermore, for best results the motor air gap should be relatively small because this increases the time constant $$\frac{(L)}{R}$$

of the rotor circuit and prolongs the dynamic braking effect which, of course, is due to the presence of rotor flux.

In the modification shown in Fig. 2, the contacts 15 and 16 have been given time delayed opening, instantaneous closing characteristics by means of a special construction of the relays 9 and 10. This construction consists in having the operating means for the contacts 15 and 16 separable from the operating means for the contacts 12 and 11 respectively, and urging these two operating means together by means of springs 17 and 18, combined with one way dash pots 19 and 20.

In operation, when, for example, relay 9 is energized, contacts 12 will close immediately, but due to the retarding action of the dash pot 19, contacts 15 will remain closed, this action being permitted by the spring 17 which allows the parts to separate. In a short time, however, the spring in acting on the dash pot 19 will cause the opening of the contacts 15. During the short interval when the contacts 12 and 15 are closed, the capacitor 14 will be in parallel with the running capacitor 7, thus markedly increasing the starting torque of the motor. As soon as the motor gets up speed, the opening of the contacts 15 will disconnect the capacitor 14 and the motor will run on the running capacitor 7 alone. However, when relay 9 is de-energized, the contacts 15 will close immediately upon the opening of the contacts 12, thereby producing the braking connection previously described in connection with Fig. 1.

The operation during reversal by means of the relay 10 will be obvious from what has already been said in connection with relay 9.

It will thus be seen that in Fig. 2, the auxiliary capacitor 14 serves the double purpose of increasing the starting torque of the motor and providing an effective dynamic braking element for the motor after it has been disconnected from the line.

Fig. 3, in so far as the motor connections are concerned, is exactly the same as Fig. 1 except that capacitor 14 has been omitted and the contacts 15 and 16 when closed simultaneously serve to short circuit the capacitor 7. As previously mentioned, this produces a definite braking effect which while not as effective as the braking effect produced with a braking capacitor, nevertheless, it is sufficient for certain purposes where extremely quick stopping is not necessary.

In Fig. 4 there is shown a modification of the invention applied to a capacitor motor of the type having a centrifugal switch 21. The relay 9 is provided with two additional sets of contacts 22 and 23 and likewise, the relay 10 is provided with two additional sets of contacts 24 and 25.

Generally described the operation is such that the motor starts in either direction with both the running capacitor and the auxiliary capacitor 14 in parallel but after it is up to speed, the auxiliary capacitor 14 is cut out by the centrifugal switch and motoring is secured with the running capacitor alone. The braking is in two steps. The first step, which lasts until the centrifugal switch opens, consists of dynamic braking with the two capacitors in parallel and the second step, which lasts from the time the centrifugal switch opens until the motor is at rest, consists of dynamic braking with both capacitors short-circuited.

The detailed description of this operation is as follows. Assume that the switch F for forward operation is closed, thereby energizing the relay 10 and causing it to close its contacts 13 and 14 and open its contacts 16 and 25. Closure of contacts 13 connects the motor winding 2 directly across the supply circuit. At the same time the capacitor 14 is connected in parallel with the capacitor 7 through the centrifugal switch 21 and the contacts 24 in series. As soon as the motor gets well under way the centrifugal switch opens, thus opening the circuit through the auxiliary capacitor 14 and causing the motor to operate in a normal manner with only the running capacitor. If switch F is now opened, the relay 10 drops out thereby closing its contacts 16 and 25 and opening its contacts 13 and 24. The effect of opening the contacts 13 is to disconnect the motor from the supply circuit. There is no effect caused by the opening of the contacts 24 because the centrifugal switch is already open. The closure of the contacts 16 connects the capacitor 14 in parallel with the capacitor 7 in a circuit containing the contacts 15 of relay 9, thereby securing the effective dynamic braking previously described in connection with Fig. 1. When the speed has dropped to a low enough value the centrifugal switch closes, thereby short-circuiting both of the capacitors through a circuit which may be traced from the upper left hand terminal of the motor through a conductor 26, the contacts 23 and 25 in series, the centrifugal switch 21 and the contacts 16 and 15 in series, and down to the upper right hand terminal of the motor. This, therefore, produces effective low speed dynamic braking, for, as previously explained, at low speeds braking is best secured by having the motor capacitance approach infinity which in effect is what happens when the capacitors are short-circuited.

The operation for reverse direction starting and braking as controlled by reversing switch R is exactly the same as described before in connection with the control by the forward switch F except that the contacts 12 produce the forward connections and the contacts 22 are in series with the closed centrifugal switch 21 so as to connect the capacitor 14, for starting, in parallel with the running capacitor.

In Fig 5, the motor starts on the running capacitor alone and is provided with two-step braking controlled by a special three-relay arrangement in which the forward and reverse relays 9 and 10 are provided with novel means for giving them time delayed, drop out characteristics. The first step of braking consists of a plugging connection in which connections for reverse motor operation are completed for a short time. The second and last step of braking is dynamic braking with two capacitors in parallel as in Fig. 1.

The common lead for relays 9 and 10 contains the operating winding of the third relay 27 which is provided with four sets of contacts 28, 29, 30 and 31.

The operation is as follows. When the forward switch F is closed, the operating windings of the relays 10 and 27 are energized in series from across the supply circuit. A connection for causing forward operation of the motor is then completed through contacts 13 of relay 10 and contacts 30 of relay 27 in series. At the same time, a seal-in circuit for the relay 10 is completed through the winding of this relay, a second set of contacts 32 thereon, a capacitor 33, a conductor 34 to the upper left hand terminal of the motor 2 which, of course, is at a different potential than that of the lower conductor of the supply circuit. The auxiliary capacitor 14 will be short-circuited through the contacts 30 of the relay 27. The motor will thus be started and will come up to speed and run as an ordinary capacitor motor. If now the forward switch F is opened, the relay 27 will drop out immediately but the relay 10 will remain energized until the contacts 31 of the relay 27 close. As soon as the contacts 31 close, the operating winding of the relay 10 and the capacitor 33 are short circuited through the contacts 31 of relay 27 and contacts 13 of relay 10 in series.

Relay 10, however, will not drop out immediately because of a capacitor 35 which is connected in parallel with its operating winding. This parallel connection of the winding 10 and capacitor 35 produces an oscillating circuit and this permits an oscillating current to flow at the natural frequency of this circuit for a predetermined time which is determined by the constants of this circuit. If the ratio of resistance to inductance of the relay coil is made small enough and the capacitance 35 is properly chosen, the relay will hold in for a time long enough to energize the motor in a reverse direction and decelerate it effectively. This plugging connection is as follows. From the lower side of the supply circuit through the contacts 13 and 31 in series to the upper left hand terminal of the motor. It is to be noted that in this plugging connection the short circuit of the capacitor 14 and the forward connections for the motor have been opened by the opening of the contacts 30 and the capacitor 14 has been connected in parallel with the capacitor 7 by the closing of the contacts 31 so that the plugging connection is a two capacitor connection, thus giving an extra strong reverse braking torque to the motor. As soon as the energy stored in the coil of relay 10 and capacitor 35 has been dissipated sufficiently, relay 10 will drop out and the entire circuit will be de-energized. Braking will now be two-capacitor dynamic braking as in Fig. 1 by reason of the fact that capacitor 14 is still connected in parallel with the capacitor 7 through the contacts 31 of relay 27.

For reverse operation, the closure switch R simultaneously energizes the relays 9 and 27, thereby completing a circuit for forward action of the motor through contacts 12 of relay 9 and contacts 28 of relay 27 in series, this connection being to the upper left hand terminal of the motor. Relay 9 is sealed-in through a set of contacts 37 thereon and a capacitor 38, the connection being to the upper right hand terminal of the motor. When reversing switch R is opened, relay 27 drops out immediately but relay 9 stays energized for an appreciable time by means of the time delay circuit produced by its winding and a capacitor 39 connected in parallel with it. The opening of the contacts 28 and closing of the contacts 29 of the relay 27 reverses the energization of the motor through the contacts 12, while the opening of the contacts 30 and the closing of the contacts 31 opens the short circuit around the capacitor 14 and connects it in parallel with the capacitor 7 so that a two capacitor plugging circuit is temporarily established. After a short time, the energy in the oscillating circuit is dissipated and the relay 9 drops out, thus completely de-energizing the motor and allowing it to be braked to rest by means of the parallel capacitor dynamic braking circuit which has already been described.

Fig. 6 differs from Fig. 5 in that additional sets of contacts 40 and 41 are added to relays 9 and 10 respectively for completing a short circuit of both capacitors 7 and 14 when the relays 9 and 10 are de-energized.

The operation of Fig. 6, therefore, differs from that of Fig. 5 only with respect to the second and last step of the braking action, it being a dynamic braking connection with short-circuited capacitors in Fig. 6, and a dynamic braking connection with two parallel connected capacitors in Fig. 5.

The capacitor 14, therefore, is not as important in Fig. 6 as it is in Fig. 5 and it may be omitted if desired, although the best results are obtained if it is present because it produces a stronger reversing effect during the first or plugging stage of the braking.

It has been found that most ordinary alternating current relays and contactors have windings which have a ratio of resistance to inductances which is too high to adapt them readily to the novel oscillating, time delay, drop out circuit employed. In order to correct for this, separate reactors 42 and 43 are connected in series with the operating windings of the relays 9 and 10 respectively. These reactors have a relatively low resistance compared to their inductance so that the over-all ratio of inductance to resistance of the time delay circuits is increased, thereby increasing the time constants of these circuits.

In order to be able readily to adjust the time delay settings of the relays, adjustable resistors 44 and 45 are also connected in the oscillating time delayed circuits.

In the above described circuits, effective braking is secured by means of novel braking circuits associated with the motor and these braking circuits require only inexpensive circuit elements such as capacitors, reactors, resistors, and additional relay contacts.

While there have been shown and described particular embodiments of the invention, it will be obvious to those skilled in the art that changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In an electrical control system, an alternating current supply circuit, an alternating current contactor having an operating winding, circuit making and breaking contacts for connecting said winding to said circuit and disconnecting it therefrom, means for delaying the drop out of said contactor after said contacts disconnect it from said circuit comprising a capacitor connected in parallel circuit relation with said winding for producing an oscillating circuit, and a relatively low resistance high reactance winding connected in said oscillating circuit in series with said winding and said capacitor for increasing the ratio of inductance to resistance of said oscillating circuit.

2. In an electrical control system, an alternating current supply circuit, an alternating current contactor having an operating winding, circuit making and breaking contacts for connecting said winding to said circuit and disconnecting it therefrom, means for delaying the drop out of said contactor after said contacts disconnect it from said circuit comprising a capacitor connected in parallel circuit relation with said winding for producing an oscillating circuit, a relatively low resistance high reactance winding connected in said oscillating circuit in series with said winding and said capacitor for increasing the ratio of inductance to resistance of said oscillating circuit, and an adjustable resistor connected in said oscillating circuit for adjusting the amount of time delay in the drop out of said contactor.

3. In a motor control system, an alternating current supply circuit, a single phase motor having a pair of stator windings and a phase splitting impedance connected permanently in series with each other, a braking capacitor, and circuit controlling means for selectively connecting said motor to said supply circuit for forward and reverse operation and for disconnecting said motor from said circuit and coincidentally with said disconnection connecting said braking capacitor in shunt with said phase splitting impedance and in series with both of said stator windings.

4. In a motor control system, an alternating current supply circuit, a single phase motor having a two winding stator and a rotor between which the air gap is relatively small, a phase splitting capacitor, said capacitor and the two stator windings being permanently connected in series circuit relation, circuit controlling means for selectively connecting either one or the other of said windings across said supply circuit in series with said capacitor for forward and reverse motor operation respectively, said means also having an intermediate condition in which both said windings are disconnected from said supply circuit, and a braking capacitor arranged to be connected in shunt with said phase splitting capacitor and in series with both of said stator windings by said means whenever said means is in its intermediate condition.

5. In combination, an alternating current supply circuit, an induction motor provided with a phase splitting capacitor, circuit controlling means for selectively connecting said motor to said circuit and for disconnecting it therefrom and an auxiliary capacitor, said circuit controlling means being adapted to connect said auxiliary capacitor temporarily in parallel with said phase splitting capacitor when it connects said motor to said circuit and for connecting said auxiliary capacitor in parallel with said phase splitting capacitor whenever it disconnects said motor from said supply circuit.

6. In combination, an alternating current supply circuit, an induction motor provided with a phase splitting capacitor, an auxiliary capacitor, means including a centrifugal switch for connecting said auxiliary capacitor in parallel with said phase splitting capacitor at speeds of said motor below a predetermined value, circuit controlling means for connecting said motor to said circuit and for disconnecting it therefrom, said circuit controlling means including elements for connecting said capacitors in parallel as soon as it disconnects said motor from said supply circuit, and an auxiliary circuit controlled by the coincidental closing of said centrifugal switch and the disconnection of said motor from said supply circuit for short circuiting both of said capacitors.

7. In combination, an alternating current supply circuit, a capacitor motor having a pair of stator windings and a phase splitting capacitor permanently connected in series, a connection from the junction of said windings to one side of said supply circuit, a pair of relays having substantially instantaneous pick-up and time delayed drop-out, a third relay having substantially instantaneous pick-up and substantially instantaneous drop-out, an auxiliary capacitor, a set of contacts on said third relay for connecting said auxiliary capacitor in parallel with said phase splitting capacitor when said relay is dropped-out, switching means for connecting and disconnecting said third relay to and from said supply circuit selectively with either one of said time delay drop-out relays, serially connected sets of contacts on said third relay and on said time delay drop-out relays for connecting opposite terminals of said phase splitting capacitor to the other side of said circuit for causing forward and reverse operation of said motor depending upon which time delay drop-out relay is energized and picked-up, seal-in circuits for each of said time delay drop-out relays completed through contacts thereon when they are picked-up, said third relay having contacts for simultaneously short-circuiting said time delay drop-out relays and making reversing connections between said motor and said supply circuit when it drops-out whereby during the drop-out period of said time delay drop-out relays said motor is braked by plugging with both capacitors connected in parallel and after said drop-out period has expired said motor is braked dynamically with both capacitors connected in parallel.

8. In combination, an alternating current supply circuit, an induction motor provided with a phase splitting capacitor, an auxiliary capacitor, a relay circuit comprising a time delay drop out relay for controlling a connection of said motor to said circuit for forward operation, a time delay drop out relay for controlling a connection of said motor to said circuit for reverse operation, and an instantaneous drop out relay, said relays being so interrelated that during the delayed drop out of either the forward or reverse direction controlling relays the auxiliary capacitor is connected in parallel with the phase splitting capacitor and the motor is connected to the supply circuit for electric braking by plugging, said relay circuit being further arranged to short circuit both of said capacitors upon the expiration of the delayed drop out period of either the forward or reverse direction controlling relay.

HARRY R. WEST.